US 8,244,881 B2

United States Patent
Thornton et al.

(10) Patent No.: US 8,244,881 B2
(45) Date of Patent: Aug. 14, 2012

(54) SERVICE VIRTUALIZATION OVER CONTENT-CENTRIC NETWORKS

(75) Inventors: James D. Thornton, Redwood City, CA (US); Van L. Jacobson, Woodside, CA (US); Diana K. Smetters, Belmont, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 103 days.

(21) Appl. No.: 12/852,302

(22) Filed: Aug. 6, 2010

(65) Prior Publication Data

US 2012/0036180 A1     Feb. 9, 2012

(51) Int. Cl.
    *G06F 15/16*      (2006.01)
(52) U.S. Cl. ........ 709/227; 709/201; 709/202; 709/203; 709/228; 709/229; 709/230
(58) Field of Classification Search .................. 709/201, 709/202, 203, 227, 228, 229, 230
See application file for complete search history.

(56) References Cited

U.S. PATENT DOCUMENTS

| 6,772,333 | B1 * | 8/2004 | Brendel | 713/153 |
| 2002/0048269 | A1 | 4/2002 | Hong | |
| 2009/0300407 | A1 * | 12/2009 | Kamath et al. | 714/4 |
| 2010/0046546 | A1 * | 2/2010 | Ram et al. | 370/468 |
| 2010/0131660 | A1 * | 5/2010 | Dec et al. | 709/228 |
| 2011/0022812 | A1 * | 1/2011 | van der Linden et al. | 711/163 |
| 2011/0153840 | A1 * | 6/2011 | Narayana et al. | 709/227 |

FOREIGN PATENT DOCUMENTS

EP     2124415 A2     11/2009

OTHER PUBLICATIONS

Shneyderman, Alex et al., "Mobile VPN: Delivering Advanced Services in Next Generation Wireless Systems", Jan. 1, 2003, pp. 3-29.

\* cited by examiner

*Primary Examiner* — Liangche A Wang
(74) *Attorney, Agent, or Firm* — Shun Yao; Park, Vaughan, Fleming & Dowler LLP

(57) ABSTRACT

One embodiment of the present invention provides a system for facilitating network service virtualization. During operation, the system receives a service request from a client, and initializes a communication session with the client. The system constructs an interest using session state information that can identify the client and/or a previous communication session. The interest comprises a hierarchically structured variable-length name. The system then broadcasts the interest to a number of servers. The system subsequently forwards to the client data received from a server which responds first to the interest.

25 Claims, 5 Drawing Sheets

SERVICE VIRTUALIZATION OVER CONTENT-CENTRIC NETWORKS

RELATED APPLICATION

The subject matter of this application is related to the subject matter of the following applications:

U.S. patent application Ser. No. 12/123,344, entitled "VOICE OVER CONTENT-CENTRIC NETWORKS," by inventors Paul J. Stewart, Van L. Jacobson, Michael F. Plass, and Diana K. Smetters, filed 19 May 2008;

U.S. patent application Ser. No. 12/332,560, entitled "METHOD AND APPARATUS FOR FACILITATING COMMUNICATION IN A CONTENT-CENTRIC NETWORK," by inventor Van L. Jacobson, filed 11 Dec. 2008;

U.S. patent application Ser. No. 12/565,005, entitled "SYSTEM FOR FORWARDING A PACKET WITH A HIERARCHICALLY STRUCTURED VARIABLE-LENGTH IDENTIFIER," by inventors Van L. Jacobson and James D. Thornton, filed 23 Sep. 2009;

U.S. patent application Ser. No. 12/603,336, entitled "ADAPTIVE MULTI-INTERFACE USE FOR CONTENT NETWORKING," by inventors Van L. Jacobson and James D. Thornton, filed 21 Oct. 2009;

U.S. patent application Ser. No. 12/638,478, entitled "SYSTEM FOR FORWARDING PACKETS WITH HIERARCHICALLY STRUCTURED VARIABLE-LENGTH IDENTIFIERS USING AN EXACT-MATCH LOOKUP ENGINE," by inventors Van L. Jacobson and James D. Thornton, filed 15 Dec. 2009; and U.S. patent application Ser. No. 12/640,968, entitled "METHOD AND SYSTEM FOR FACILITATING FORWARDING A PACKET IN A CONTENT-CENTRIC NETWORK," by inventors Van L. Jacobson and James D. Thornton, filed 17 Dec. 2009;

the disclosures of which are incorporated by reference in their entirety herein.

FIELD

The present disclosure relates generally to content-centric network. More specifically, the present disclosure relates to an apparatus and a method for facilitating service virtualization over content-centric network.

RELATED ART

The proliferation of the Internet and e-commerce continues to fuel revolutionary changes in the network industry. Today, a significant number of information exchanges, from online movie viewing to daily news delivery, retail sales, and instant messaging, are conducted online. An increasing number of Internet applications are also becoming mobile. However, the current Internet operates on a largely location-based addressing scheme. That is, a consumer of data can only receive the data by explicitly requesting the data from an address (e.g., IP address) closely associated with a physical object or location. This restrictive addressing scheme is becoming progressively inadequate for meeting the ever-changing network demands.

The current architecture of the Internet revolves around a conversation model, which was created in the 1970s for the ARPAnet to allow geographically distributed users to use a few big, immobile computers. This architecture was designed under the influence of the telephone network, where a telephone number is essentially a program that configures the switches along a path from the source to the destination. Not surprisingly, the designers of the ARPAnet never expected it to evolve into today's ubiquitous, relentlessly growing Internet. People now expect a lot more from the Internet than what the ARPAnet was designed for. Ideally, an Internet user should have access to any content, anywhere, at any time—a task that is difficult to perform with the current location/device-binding TCP/IP (transmission control protocol/Internet protocol) networks.

Content-centric networks (CCN), also referred to as "content-based networks," bring a new approach to data transport in a network. Instead of having network traffic viewed at the application level as end-to-end conversations over which content travels, content is requested or returned based on the name given to it, and the network is responsible for routing data, or "content," from the provider to the consumer.

SUMMARY

One embodiment of the present invention provides a system for facilitating network service virtualization. During operation, the system receives a service request from a client, and initializes a communication session with the client. The system constructs an interest using session state information that can identify the client and/or a previous communication session. The interest comprises a hierarchically structured variable-length name. The system then broadcasts the interest to a number of servers. Subsequently, the system forwards to the client data received from a server which responds first to the interest.

In one variation on this embodiment, the system disregards future responses from unselected servers.

In one variation on this embodiment, the data is forwarded to the client over a transport control protocol (TCP) session, and the interest includes a TCP session identifier.

In a further variation, the session state information includes a hypertext transfer protocol (HTTP) cookie.

In one variation on this embodiment, the data is forwarded to the client over a secure socket layer (SSL) session.

In a further variation, the session state information includes an SSL session identifier.

In one variation on this embodiment, the system receives a packet responding to the service request from the first server. Corresponding session state information is embedded in a name of the packet, thereby facilitating the first server to receive future packets from the client for the communication session.

In one variation on this embodiment, the system forwards a packet from the client to a second server. The second server is configured to receive session state information associated with the session from the first server.

In a further variation, receiving the session state information from the first server includes broadcasting, from the second server to all servers, an interest for the session state information and receiving a response from the first server. The response contains the session state information associated with the communication session, thereby enabling the communication session to continue on the second server.

In one variation on this embodiment, the system selects a second server as a backup server for the first server. The second server is configured to maintain a copy of session state information associated with the communication session. The system forwards a packet from the client to the second server in response to the failure of the first server, and reconstructs the communication session on the second server using the copy of the session state information.

In one variation on this embodiment, the system sends an acknowledgment to the server which responds first to the interest.

BRIEF DESCRIPTION OF THE FIGURES

In the figures, like reference numerals refer to the same figure elements.

DETAILED DESCRIPTION

Figure 1A:
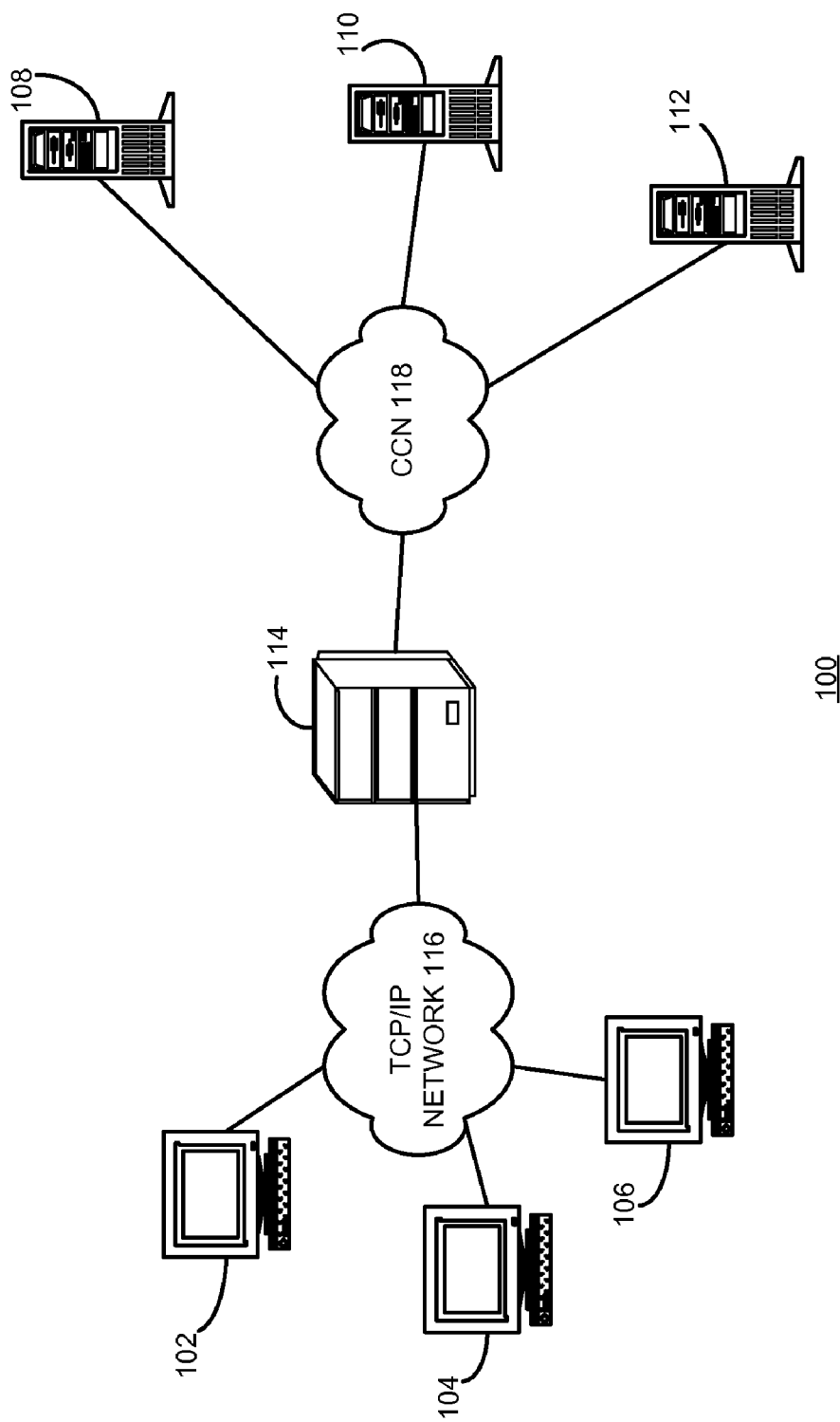
FIG. 1A presents a diagram illustrating exemplary network architecture in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Overview

Embodiments of the present invention facilitate network service virtualization that distributes server functionalities across multiple servers efficiently and securely. During operation, a client requests a network service from a proxy server, which constructs an interest to be broadcast to all servers. Based on the servers' responses, the proxy server selects a server to forward the client's request. After a winner is declared, the other servers suppress their responses and a session is established between the client and the selected server. Once a session has been established at the selected server, the system can use CCN naming conventions to communicate packets for that session to and from the selected server.

In some embodiments, the session state is embedded in the CCN names of the packets and travels with the packets, thus enabling a stateless proxy server. In some embodiments, the established session can move from one server to the other, and the state information can be pulled from a previous server to the current server where the session is now established.

Content-Centric Network

In a content-centric network (CCN), communication is driven by the consumers of data. In a CCN, there are two packet types, interest and data. An interest packet (also called a query) is a request for some content. An interest packet encodes a special form of query that expresses what content is desired and what content is not desired. A data packet (also called a content packet) is a unit of content. Data packets are self-identifying by carrying within them their full name. A consumer asks for content by broadcasting its interest over all available connectivity. Any node hearing the interest and having data that satisfies it can respond with a data packet. Data is transmitted only in response to an interest and consumes that interest. Both interest and data identify the content being exchanged by the content name (or CCN name). In one embodiment, data can "satisfy" an interest if the CCN name in the interest packet is a prefix of the CCN name in the data packet.

CCN names are opaque, binary objects composed of an explicitly specified number of components. In addition, CCN names are persistent and content-specific. That is, if one changes the content of a file or data object, the content is effectively associated with a new name. This persistency can be achieved with an explicit versioning mechanism, where, for example, the new content can be "version 4" of a given name. The persistency can also be achieved implicitly. For example, contents can be associated with not only their human-established names, but also with authentication metadata (e.g., a digital signature by the publisher of the content). As a result, the complete content name changes when the data associated with a given name changes.

Functionally, a CCN can retain associations between various names and the content which they represent. The names are hierarchically structured and have variable length, and in many situations can be understood by a user. For example, "/abcd/bob/papers/ccn/news" could be the name of an article, i.e., the "news" article from the "ccn" collection of papers for a user named "Bob" at the organization named "ABCD." In a CCN, from an application's perspective, there is no need for a content consumer to determine how to find the "ABCD" organization, or to find which host there holds Bob's CCN publications. In one embodiment, to request a piece of content, a device in the CCN registers with the network that it is interested in that content by its name, and the content, if available in the local network, is routed back to it. The routing infrastructure takes care of intelligently propagating the interest to the prospective publishers, and then carrying any available content back along the path which the interest traversed.

CCNs have additional properties which make them especially appealing. All content can be cryptographically authenticated, meaning that some subset of nodes on the network (e.g., a legitimate querier of the content) can verify the authenticity of a piece of content. CCNs also allow data to be accessed by name, independent of publisher. At the same time, one can tailor a specialized request for data by a certain publisher. For example, one can ask for "foo.txt," or "foo.txt signed by Bob." Any forms of self-verifying names can be used as a contract between producer and consumer. It is also possible to use hybrid self-verifying names, where the former components of the name are for organization and efficient routing, and the latter components of the name are self-verifying. Finally, CCN allows the separation of content and trust, enabling different data consumers to use different mechanisms for establishing trust in the same piece of content. Although content might have been signed by a single publisher, it can be trusted for different reasons. For example, one user might trust a given piece of content because of a direct personal connection with its signer, whereas another user might trust the same content because of the content signer's participation in a Public Key Infrastructure (PKI) which that user has chosen to trust.

Virtualized Network Services over CCN

Network service virtualization has been of great importance in dealing with complex network architectures. CCN can be a valuable tool in implementing virtualized network services in a variety of network environments, including conventional TCP/IP networks.

In a conventional TCP/IP network, service virtualization can be implemented via a load balancer that maintains TCP session state information. When handling a service request from a client, the load balancer can examine the TCP cookie on the client to determine whether there is pre-existing TCP session state information on any one of the servers. If so, the load balancer can direct the request to the corresponding server. Otherwise, the load balancer selects a server based on a random round-robin type of scheme or based on the load of the servers. However, service virtualization of servers coupled to a CCN is different from that of the TCP/IP network.

FIG. 1A presents a diagram illustrating exemplary network architecture in accordance with an embodiment of the present invention. Network 100 includes a number of clients, including clients 102-106, and a number of servers, including servers 108-112. Clients 102-106 are coupled to a proxy server 114 via a conventional TCP/IP network 116, and servers 108-112 are coupled to proxy server 114 via a CCN 118. Note that clients 102-106 may represent nodes on TCP/IP network 116 with computational capability and mechanisms for communicating across the network. For example, clients 102-106 may correspond to personal computers (PC), laptop computers, workstations, and/or other electronic computing devices with network connectivity. Furthermore, clients 102-106 may couple to TCP/IP network 116 using wired and/or wireless connections. Similarly, servers 108-112 may correspond to nodes that include functionality to service requests from clients 102-106. Servers 108-112 may be computing clusters, or stand-alone servers. Proxy server 114 acts as an intermediary for requests from clients 102-106 seeking resources from servers 108-112. In one embodiment, proxy server 114 is a load balancer that can process TCP connections from clients 102-106 and receive Hypertext Transfer Protocol (HTTP) requests. In addition, proxy server 114 can distribute HTTP requests from clients 102-106 among servers 108-112. In one embodiment, proxy server 114 is a border gateway located between a conventional TCP/IP network and a CCN capable of virtualizing secure services, such as Hypertext Transfer Protocol Secure (HTTPS), which is a combination of HTTP and the Secure Sockets Layer (SSL) protocol.

During operation, a client (such as client 102) requests a network service from proxy server/load balancer 114, via TCP/IP network 116. For example, client 102 can request a webpage from load balancer 114 using an HTTP request. A TCP connection can be established between client 102 and load balancer 114 via a standard three-way handshake. Note that the three-way handshake process includes: (1) client sending a TCP synchronize (SYN) packet to the server; (2) server receiving the SYN packet and sending a synchronize-acknowledgement (SYN-ACK) packet to the client; and (3) the client sending an ACK packet back to the server.

After completing the three-way handshake, load balancer 114 inspects the client request for information that can help identify the client and determine whether there has been an existing session. If so, load balancer 114 constructs a CCN interest based on such information. In one embodiment, such information can include the session state. If the client request is an HTTP request, load balancer 114 can examine an HTTP cookie (if present) sent by client 102, and constructs a CCN interest packet based on the cookie. In one embodiment, the CCN name included in the interest packet includes information associated with the TCP connection and the cookie. For example, the CCN name can include the following name: /SYN/<5T>/<cookie>/<seq>/<my.seq>/, where <5T> is a 5-tuple transport signature for the TCP connection, <seq> is a random sequence number selected by client 102, and <my.seq> is the acknowledgement sequence number selected by the load balancer (the value of which is one more than the client sequence number). Note that the 5-tuple transport signature includes: {source IP address, source port number, destination IP address, destination port number, and the connection type}, where "connection type" identifies the transport-layer protocol, such as "TCP" or "user datagram protocol (UDP)."

Load balancer 114 broadcasts its interest to all servers. Each server can then examine the cookie, which is included in the CCN name, to determine if there is a pre-existing session between client 102 and the server. The server with a matching session would respond to the interest in a timely manner so it can be selected by load balancer 114. For example, server 108 may send a response to load balancer 114 indicating that the cookie sent by client 102 matches a cookie sent by server 108 to client 102. Other servers in the network will refrain from responding to the interest after observing server 108's response. Subsequently, load balancer 114 acknowledges server 108's response and may announce its selection to all servers. In case there are more than one server responding to the interest, load balancer 114 may select one of the responding servers. In one embodiment, load balancer 114 broadcasts an interest packet with a CCN name that includes the following string: /SYN/<5T>/<cookie>/<seq>/<my.seq>/Server 108/, indicating that server 108 is the selected server. Server 108 can respond to load balancer 114 confirming itself as the selected server, whereas other servers including servers 110-112 cease to respond further to load balancer 114's interests for the same session. Once confirmed, a session is established between client 102 and server 108. Future packets for that session from client 102 are translated into CCN packets by load balancer 114. The naming convention of these CCN packets ensures that the packets for the same session are forwarded to selected server 108. For example, the CCN names of these packets may specify selected server 108. Note that client 102 is not aware of the existence of CCN servers 108-112 and the fact that requests are forwarded to one of the servers. Client 102 is only aware of the conventional TCP connection established between client 102 and load balancer 114.

Figure 1B:
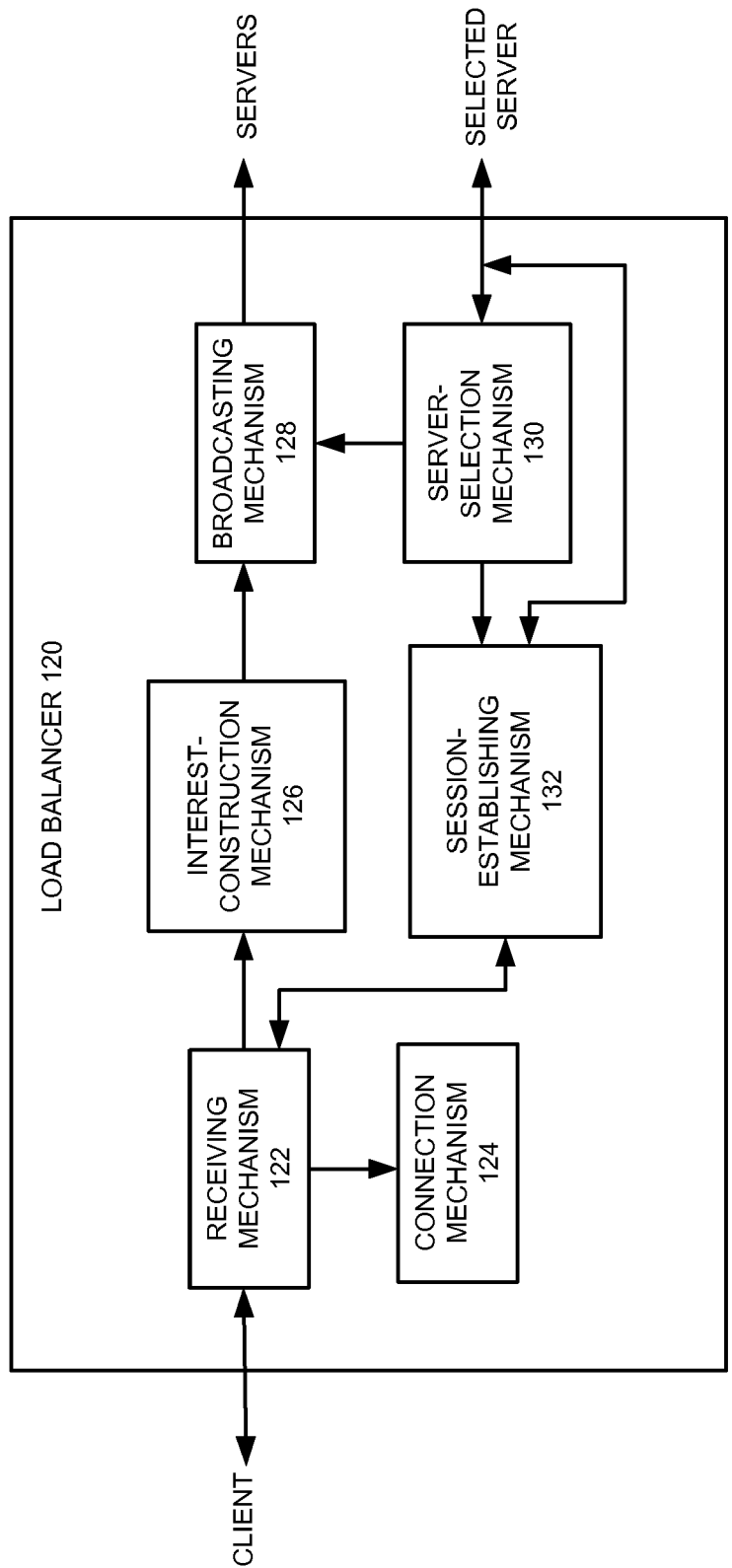
FIG. 1B provides a block diagram illustrating the structure of a load balancer/proxy server in accordance with an embodiment of the present invention.

FIG. 1B provides a block diagram illustrating the structure of a load balancer/proxy server in accordance with an embodiment of the present invention. Load balancer 120 includes a receiving mechanism 122, a connection mechanism 124, an interest-construction mechanism 126, a broadcasting mechanism 128, a server-selection mechanism 130, and a session-establishing mechanism 132. During operation, receiving mechanism 122 receives a connection request from a client, and connection mechanism 124 establishes a connection between load balancer 120 and the client. Interest-construction mechanism 126 constructs an interest based on the client request. If a cookie is present in the request, the CCN name of the constructed interest includes the cookie. Broadcasting mechanism 128 broadcasts the interest to all listening servers. Server-selection mechanism 130 selects a server based on responses received from the servers. Server-selection mechanism 130 further announces to all servers its selection and receives a confirmation from the selected server. Once confirmed, session-establishing mechanism 132 establishes a session between the client and the selected server.

Figure 2:
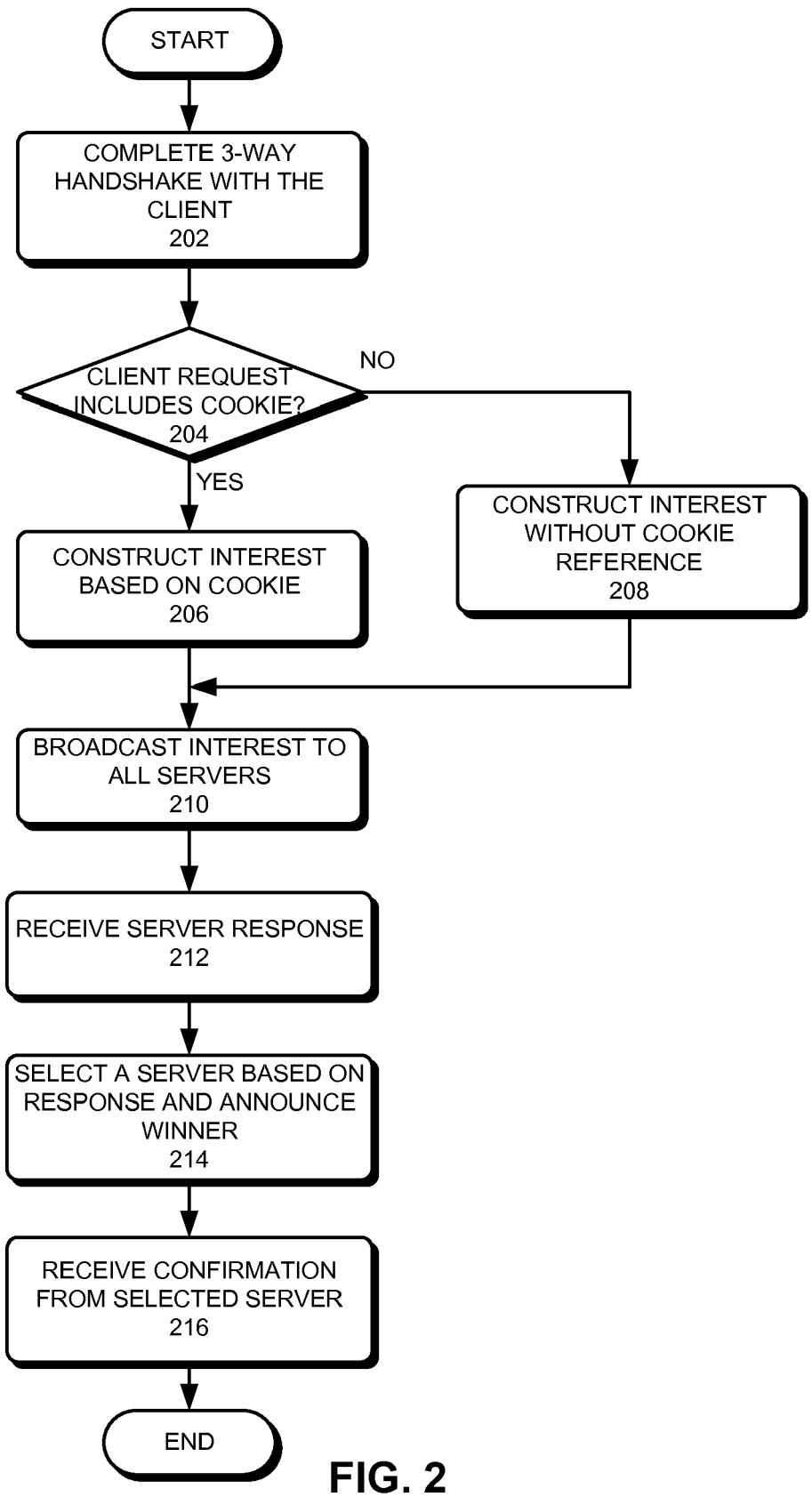
FIG. 2 presents a flowchart illustrating the process of emulating a TCP connection between a TCP client and a CCN server in accordance with an embodiment of the present invention.

FIG. 2 presents a flowchart illustrating the process of emulating a TCP connection between a TCP client and a CCN-enabled server in accordance with an embodiment of the present invention. During operation, a load balancer completes a three-way handshake with the client (operation 202). The load balancer then determines whether the request from the client includes a cookie (operation 204). If so, the load balancer constructs an interest based on the cookie (operation 206). Otherwise, the load balancer constructs an interest that does not reference a cookie (operation 208). In one embodiment, the load balancer constructs an interest based on the 5-tuple transport signature. Subsequently, the load balancer broadcasts the interest to all servers (operation 210), and receives responses from a number of servers (operation 212). The load balancer then selects a server based on the response from the servers and announces the winner in an interest packet broadcast to all servers (operation 214). After receiving the announcement, the selected server confirms its status as winner to the load balancer, thus establishing a session between the selected server and the client (operation 216).

Virtualized SSL Services over CCN

Secure Sockets Layer (SSL) or Transport Layer Security (TLS) protocol provides security for communications over an insecure network, such as the Internet, by encrypting the segments of network connections at the transport layer. The combination of HTTP and SSL/TLS provides an HTTPS connection, which is often used for payment transactions on the World Wide Web (WWW) and for sensitive transactions in corporation information systems. Other applications that implement SSL/TLS include web browsing, electronic mail, Internet faxing, instant messaging, and voice-over-IP (VoIP).

Although SSL/TLS has been widely used, virtualization of existing Internet SSL services remains a challenge in conventional networks that do not implement CCN. In a conventional network implementing SSL, HTTP cookies are encrypted, preventing the load balancer from being able to determine where to send new HTTP packets for a session. To address such an issue, an SSL accelerator is often used to terminate SSL services, thus allowing the load balancer to make better decisions on affinity based on the cookies. However, the termination of the SSL session at the accelerator creates insecure boundaries.

In a CCN, such an issue can be resolved by establishing between the client and the server a complete end-to-end secure connection in which the encryption goes all the way. In one embodiment, a load balancer situated between the TCP clients and the CCN servers (similar to load balancer 114 shown in FIG. 1) constructs interests based on the crypto state information associated with an existing session. A server maintaining the crypto state can respond to such interest prior to all other servers, thus allowing the load balancer to select such a server. In one embodiment, the load balancer can construct an interest using the TCP/IP SSL session ID. In addition, efficient load balancing with secure services (such as HTTPS) can be achieved by allowing servers to exchange SSL state data such that new or existing SSL sessions can be picked up or offloaded. As a result, the load balancer can handle any number of simultaneous SSL sessions, which can be the result of many clients behind a network address translator (NAT), without being overloaded.

Figure 3:
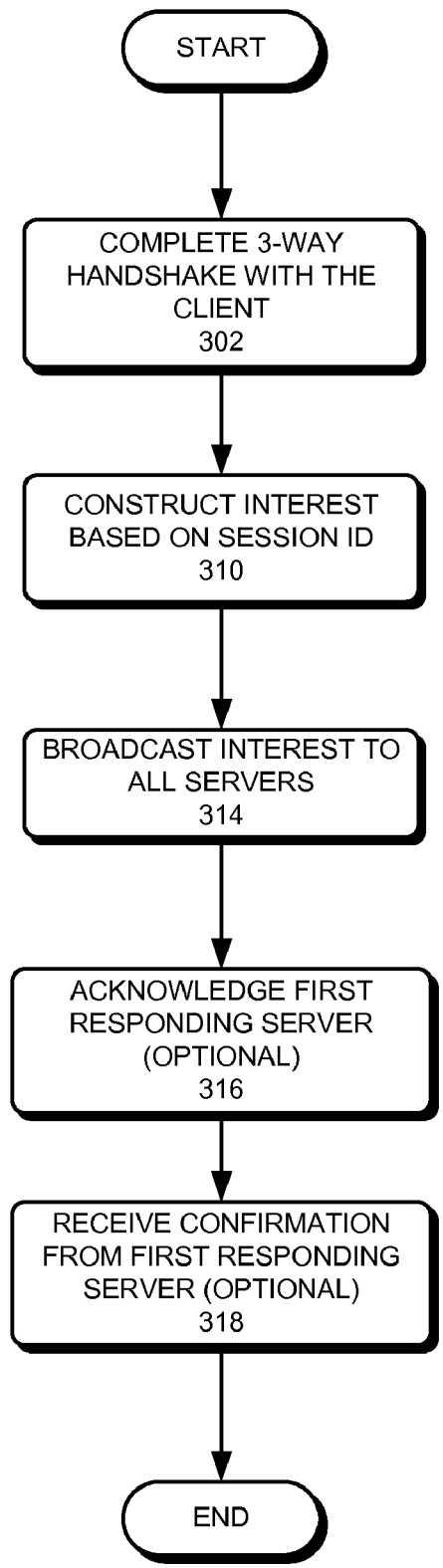
FIG. 3 presents a flowchart illustrating the process of establishing an SSL session between a TCP client and a CCN server in accordance with an embodiment of the present invention.

FIG. 3 presents a flowchart illustrating the process of establishing an SSL session between a TCP client and a CCN-enabled server in accordance with an embodiment of the present invention. During operation, a load balancer (or a border agent since it resides on the border between a TCP network and a CCN) receives packets from a client and establishes a TCP connection via a standard three-way handshake (operation 302). The load balancer then constructs an interest packet based on the SSL session information (operation 310). In one embodiment, the load balancer constructs an interest using an SSL session ID (or ticket). In addition, the TCP transport signature (the 5-tuple) can also be included in the constructed interest in order to identify an existing connection.

Subsequently, the load balancer broadcasts the interest to all servers (operation 314). In response, the server with the matching session information can send out a quick response which satisfies the interest. Since this response is transmitted in a broadcast domain, other servers can observe this response. As a result, no additional server would send a response. Subsequently, the load balancer optionally acknowledges the server that responds first as the winner and announce its selection (operation 316). Note that, if a session ID is included in the CCN name of the interest, the server storing session state information that can match the session ID will respond to the request first. In the rare case where multiple servers respond (for example if no server has the matching session information, and a number of servers wait for a randomized amount of delay before they send out responses to the interest), the load balancer can select the server which responds first. The load balancer can optionally send a confirmation to the selected server. In addition, in a case where no session ID is included in the interest, if one server already has certain soft state information that can match something in the CCN name of the interest, that server will respond faster than other servers that need to set up new connections.

Subsequently, the selected server optionally confirms its status as the winner (operation 318), and all other servers cease to respond to the connection request. Note that, once an SSL session is established at the selected server, the load balancer will construct future interest for connections for the SSL session by referencing the selected server, thus pulling all future packets for that session to and from the selected server.

In addition to the session ID, in some embodiments, other session state information can also be embedded in the CCN names, thus enabling a stateless load balancer/proxy server. In general, a stateful proxy server is a proxy server that maintains information about the status of ongoing transactions. State information can include all stored state variables and their values. A particular set of values defines a state. A proxy server changes state whenever the values of its state variables change. A stateless proxy server is one that does not store information about the status of ongoing transactions. A stateless proxy server reacts only depending on the commands given (data received) rather than based on stored state information.

Session Offloading

In some embodiments of the present invention, a session which has been established on one server may migrate to a different server due to various reasons. In one scenario, secondary servers can be used to offload traffic from primary servers during peak times in order to balance or consolidate sessions. In a further scenario, the traffic load may be spread or balanced as a function of the time of day due to energy management. For example, a service provider may choose to move intensive data processing from location to location following the setting sun in order to reduce cooling costs at data centers. Moreover, the system may need to move an existing session to secondary servers due to the failure of the primary servers or due to the degradation of network connection to the primary servers.

When a session has been moved from a primary server to a secondary server, the secondary server has no prior knowledge of the session state and would need to obtain the session state from somewhere. If the primary server is still functional, the secondary server can obtain the session state from the primary server. Otherwise, the secondary server would need to obtain the session state from a third entity or keep a backup copy of the session state.

Computer and Communication System

Figure 4:
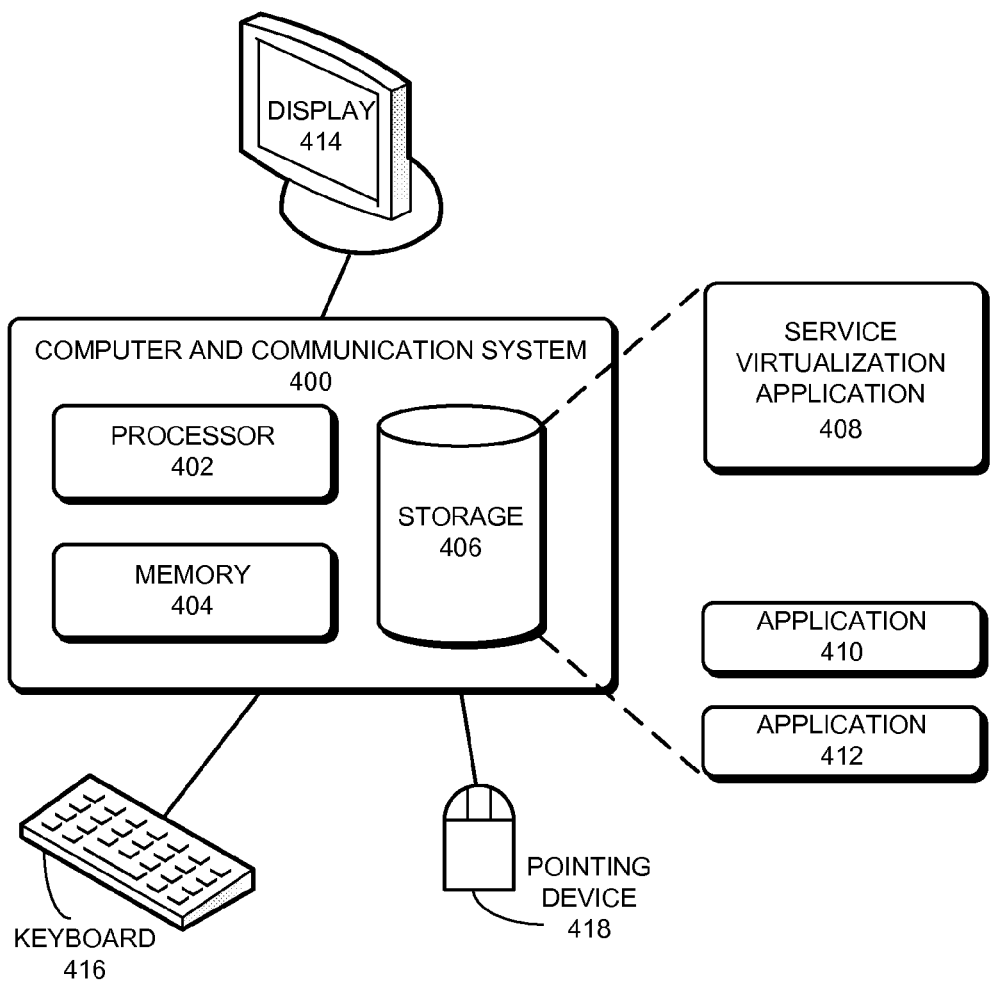
FIG. 4 presents an exemplary computer system for facilitating service virtualization over a CCN in accordance with an embodiment of the present invention.

FIG. 4 presents an exemplary computer system for facilitating service virtualization over a CCN in accordance with an embodiment of the present invention. In FIG. 4, a computer and communication system 400 includes a processor 402, a memory 404, and a storage device 406. Storage device 406 stores programs to be executed by processor 402. Specifically, storage device 406 stores a service virtualization application 408, as well as other applications, such as applications 410 and 412. During operation, service virtualization application 408 is loaded from storage device 406 into memory 404 and then executed by processor 402. While executing the program, processor 402 performs the aforementioned functions. Computer and communication system 400 is coupled to an optional display 414, keyboard 416, and pointing device 418.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-executable method for facilitating network service virtualization, comprising:
  receiving, by a proxy server, a service request from a client;
  extracting session state information from the received service request, wherein the session state information facilitates identifying a previous communication session associated with the client;
  initializing a communication session with the client;
  constructing, by the proxy sever, an interest packet, wherein the interest packet comprises a hierarchically structured variable-length name, and wherein the hierarchically structured variable-length name indicates the session state information;
  broadcasting the interest packet to a number of servers; and
  forwarding, to the client, data received from a first server which responds first to the interest packet.

2. The method of claim 1, further comprising disregarding future responses from unselected servers.

3. The method of claim 1, wherein the data is forwarded to the client over a transport control protocol (TCP) session, and wherein the interest packet includes a TCP session identifier.

4. The method of claim 3, wherein the session state information includes a hypertext transfer protocol (HTTP) cookie.

5. The method of claim 1, wherein the data is forwarded to the client over a secure sockets layer (SSL) connection.

6. The method of claim 5, wherein the session state information includes an SSL session identifier.

7. The method of claim 1, further comprising receiving a packet responding to the service request from the first server, wherein corresponding session state information is embedded in a name of the packet, thereby facilitating the first server to receive future packets from the client for the communication session.

8. The method of claim 1, further comprising:
  forwarding a packet from the client to a second server, wherein the second server is configured to receive session state information associated with the communication session from the first server.

9. The method of claim 8, wherein receiving the session state information from the first server comprises:
  broadcasting, from the second server to all servers, an interest for the session state information; and
  receiving a response, at the second server from the first server, wherein the response contains the session state information associated with the communication session, thereby enabling the communication session to continue on the second server.

10. The method of claim 1, further comprising:
  selecting a second server as a backup server for the first server, wherein the second server is configured to maintain a copy of session state information associated with the communication session;
  forwarding a packet from the client to the second server in response to a failure of the first server; and
  reconstructing the communication session on the second server using the copy of the session state information.

11. The method of claim 1, further comprising:
  sending an acknowledgment to the first server which responds first to the interest packet.

12. A system for facilitating network service virtualization, comprising:
  a receiving mechanism configured to receive a service request from a client;
  an extraction mechanism configured to extract session state information from the received service request, wherein the session state information facilitates identifying a previous communication session associated with the client;
  a communication-session-initializing mechanism configured to initialize a communication session with the client;
  an interest-construction mechanism configured to construct an interest packet, wherein the interest packet comprises a hierarchically structured variable-length name, and wherein the hierarchically structured variable-length name indicates the session state information;

a broadcasting mechanism configured to broadcast the interest packet to a number of servers; and a forwarding mechanism configured to forward to the client data received from a first server which responds first to the interest.

13. The system of claim 12, further comprising a mechanism configured to disregard future responses from unselected servers.

14. The system of claim 12, wherein the forwarding mechanism is further configured to forward the data to the client over a transport control protocol (TCP) session, and wherein the interest packet includes a TCP session identifier.

15. The system of claim 14, wherein the session state information includes a hypertext transfer protocol (HTTP) cookie.

16. The system of claim 12, wherein the forwarding mechanism is further configured to forward the data to the client over a secure sockets layer (SSL) session.

17. The system of claim 16, wherein the session state information includes an SSL session identifier.

18. The system of claim 12, further comprising a packet-receiving mechanism configured to receive a packet responding to the service request from the first server, wherein corresponding session state information is embedded in a name of the packet, thereby facilitating the first server to receive future packets from the client for the communication session.

19. The system of claim 12, wherein the forwarding mechanism is further configured to forward a packet from the client to a second server, wherein the second server is configured to receive session state information associated with the communication session from the first server.

20. The system of claim 19, wherein the second server is configured to receive the session state information from the first server by:

broadcasting, from the second server to all servers, an interest for the session state information; and receiving a response, from the first server, wherein the response contains the session state information associated with the communication session, thereby enabling the communication session to continue on the second server.

21. The system of claim 12, further comprising:

a backup mechanism configured to select a second server as a backup server for the first server, wherein the second server is configured to maintain a copy of session state information associated with the communication session; and wherein the forwarding mechanism is further configured to forward a packet from the client to the second server in response to a failure of the first server; and wherein the second server is configured to reconstruct the communication session using the copy of the session state information.

22. The system of claim 12, further comprising an acknowledgment mechanism configured to send an acknowledgment to the first server which responds first to the interest packet.

23. A non-transitory computer-readable storage device storing instructions that when executed by a computer cause the computer to perform a method for facilitating service virtualization, the method comprising:

receiving a service request from a client;

extracting session state information from the received service request, wherein the session state information facilitates identifying a previous communication session associated with the client;

initializing a communication session with the client;

constructing an interest packet, wherein the interest packet comprises a hierarchically structured variable-length name, and wherein the hierarchically structured variable-length name indicates the session state information;

broadcasting the interest packet to a number of servers; and forwarding to the client data received from a first server which responds first to the interest.

24. The storage device of claim 23, wherein the method further comprises:

forwarding a packet from the client to a second server, wherein the second server is configured to receive session state information associated with the session from the first server.

25. The storage device of claim 24, wherein receiving the session state information from the selected first server comprises:

broadcasting, from the second server to all servers, an interest for the session state information; and receiving a response, at the second server from the first server, wherein the response contains the session state information associated with the communication session, thereby enabling the communication session to continue on the second server.

* * * * *